United States Patent
Fernihough (10) Patent No.: US 12,498,499 B2
(45) Date of Patent: Dec. 16, 2025

(54) LINEAR ARRAY OF PIEZOELECTRIC TRANSDUCERS FOR TOWED MARINE STREAMERS

(71) Applicant: PGS Geophysical AS, Oslo (NO)

(72) Inventor: Robert Alexis Peregrin Fernihough, Georgetown, TX (US)

(73) Assignee: PGS Geophysical AS, Oslo (NO)

( * ) Notice: Subject to any disclaimer, the term of this patent is extended or adjusted under 35 U.S.C. 154(b) by 354 days.

(21) Appl. No.: 17/108,451

(22) Filed: Dec. 1, 2020

(65) Prior Publication Data

US 2021/0080601 A1   Mar. 18, 2021

Related U.S. Application Data

(63) Continuation of application No. PCT/EP2019/064947, filed on Jun. 7, 2019.
(Continued)

(51) Int. Cl.
*G01V 1/20* (2006.01)
*G01V 1/16* (2006.01)
(Continued)

(52) U.S. Cl.
CPC .............. *G01V 1/201* (2013.01); *G01V 1/164* (2013.01); *G01V 1/186* (2013.01); *G01V 1/3808* (2013.01);
(Continued)

(58) Field of Classification Search
CPC ........ G01V 1/201; G01V 1/164; G01V 1/186; G01V 1/3808; H10N 30/302; H10N 30/802
See application file for complete search history.

(56) References Cited

U.S. PATENT DOCUMENTS 3,202,736 A   8/1965   Horan et al.
3,832,762 A   9/1974   Johnston et al.
(Continued)

FOREIGN PATENT DOCUMENTS

AU   2003 200 979 A1   10/2003
CA       1 030 647 A    5/1978
(Continued)

OTHER PUBLICATIONS

International Search Report and Written Opinion of the International Searching Authority for International Application No. PCT/EP2019/064947, dated Oct. 9, 2010 (16 pages).
(Continued)

*Primary Examiner* — Isam A Alsomiri
*Assistant Examiner* — Vikas Atmakuri (57) ABSTRACT

One embodiment disclosed relates to an array of sensors for towed marine streamers. The array may include a first plurality of transducers of a first form configured to have a first polarity in electrical response to a change in an environmental condition and a second plurality of transducers of a second form coupled to the first plurality of transducers and configured to have a second polarity, opposite of the first polarity, in electrical response to the change in the environmental condition. The first plurality may be equal to the second plurality. The first plurality of transducers may be coupled to the second plurality of transducers in a linearly alternating fashion. The array may be coupled to a amplifier. The array may be included along a length of at least a portion of a marine streamer. Another embodiment disclosed relates to a method of acquiring sensor signals in a marine streamer being towed by a vessel during a seismic marine survey. Other embodiments, aspects and features are also disclosed.

10 Claims, 10 Drawing Sheets

Related U.S. Application Data (60) Provisional application No. 62/682,319, filed on Jun. 8, 2018.

(51) Int. Cl.
| | |
|---|---|
| *G01V 1/18* | (2006.01) |
| *G01V 1/38* | (2006.01) |
| *H10N 30/30* | (2023.01) |
| *H10N 30/80* | (2023.01) |
| *H10N 30/87* | (2023.01) |
| *H10N 30/88* | (2023.01) |

(52) U.S. Cl.
CPC ......... *H10N 30/302* (2023.02); *H10N 30/802* (2023.02); *H10N 30/875* (2023.02); *H10N 30/88* (2023.02); *G01V 2210/324* (2013.01)

(56) References Cited

U.S. PATENT DOCUMENTS

| | | | |
|---|---|---|---|
| 3,970,878 A * | 7/1976 | Berglund | B06B 1/0666 367/160 |
| 3,988,620 A | 10/1976 | McDavid | |
| 4,017,824 A * | 4/1977 | Fife | B06B 1/06 367/158 |
| 4,162,476 A | 7/1979 | Fanning | |
| 4,163,206 A | 7/1979 | Hall, Jr. | |
| 4,228,532 A * | 10/1980 | Sims | H04R 17/00 367/164 |
| 4,356,423 A * | 10/1982 | Gudzin | G08B 13/10 340/665 |
| 5,298,828 A * | 3/1994 | Radovanovich | B06B 1/0622 310/317 |
| 5,646,470 A | 7/1997 | De Groot | |
| 6,029,113 A | 2/2000 | Woodall | |
| 6,108,267 A | 8/2000 | Pearce | |
| 6,160,763 A * | 12/2000 | Cole | G01V 1/38 367/160 |
| 6,607,050 B2 | 8/2003 | He et al. | |
| 6,725,164 B1 | 4/2004 | Bednar | |
| 6,754,136 B2 | 6/2004 | Constantinou et al. | |
| 7,424,928 B2 | 9/2008 | Cox et al. | |
| 7,800,595 B2 * | 9/2010 | Hill | H10N 30/302 345/177 |
| 8,712,694 B2 | 4/2014 | Edme et al. | |
| 8,838,392 B2 | 9/2014 | Halliday et al. | |
| 9,091,783 B2 | 7/2015 | Edme et al. | |
| 9,110,187 B2 | 8/2015 | Muyzert et al. | |
| 9,594,174 B2 | 3/2017 | Goujon et al. | |
| 9,989,555 B2 | 6/2018 | Keast et al. | |
| 10,241,220 B2 | 3/2019 | Pearce | |
| 2005/0251047 A1 * | 11/2005 | Sleva | B06B 1/0688 600/459 |
| 2011/0182140 A1 | 7/2011 | Lambert et al. | |
| 2012/0163119 A1 | 6/2012 | Pearce | |
| 2012/0163120 A1 | 6/2012 | Pearce | |
| 2013/0042695 A1 * | 2/2013 | Barr | G01L 19/02 73/753 |
| 2013/0127471 A1 | 5/2013 | Sudow et al. | |
| 2015/0063062 A1 | 3/2015 | Fernihough | |
| 2015/0101731 A1 | 4/2015 | Hepp | |
| 2016/0018546 A1 | 1/2016 | Eick et al. | |
| 2017/0031040 A1 | 2/2017 | Goenner et al. | |
| 2018/0106666 A1 | 4/2018 | Tenghamn et al. | |
| 2018/0321419 A1 * | 11/2018 | Tenghamn | H04R 1/42 |
| 2018/0324507 A1 | 11/2018 | Tenghamn et al. | |
| 2018/0329094 A1 | 11/2018 | Goenner et al. | |
| 2020/0303620 A1 | 9/2020 | Tenghamn et al. | |
| 2020/0363545 A1 | 11/2020 | Booth | |
| 2021/0080601 A1 * | 3/2021 | Fernihough | G01V 1/201 |
| 2022/0406988 A1 | 12/2022 | Tenghamn et al. | |
| 2023/0417938 A1 | 12/2023 | Fernihough | |

FOREIGN PATENT DOCUMENTS

| | | |
|---|---|---|
| EP | 0 237 616 A2 | 9/1987 |
| EP | 3 312 638 A1 | 4/2018 |
| GB | 1 435 125 A | 5/1976 |
| GB | 2 227 317 A | 7/1990 |
| GB | 2 493 837 A | 2/2013 |
| GB | 2 515 658 A | 12/2014 |
| KR | 2017 007 8382 A | 7/2017 |
| WO | 2015/048494 A1 | 4/2015 |

OTHER PUBLICATIONS

International Search Report and Written Opinion in PCT/US2018/065974 dated Apr. 12, 2019.
International Preliminary Report on Patentability in PCT/US2018/065974 dated Jun. 25, 2020.
International Search Report and Written Opinion in PCT/US2018/065935 dated Mar. 18, 2019.
International Preliminary Report on Patentability in PCT/US2018/065935 dated Jun. 25, 2020.
"T-2 Hydrophone" Data Sheet (Teledyne Geophysical Instruments, Jun. 2006).
"T-2BX Hydrophones" Data Sheet (Teledyne Geophysical Instruments, May 2008).
Search Report in EP 23177792 dated Oct. 27, 2023.
Search Report and Notice of Allowance in counterpart application EP19730141.9 dated Jun. 5, 2023.
U.S. Appl. No. 19/050,060, filed Feb. 10, 2025.
Examination Report in EP 23177792 dated Feb. 3, 2025.
Search Report in EP 24213081 dated Feb. 20, 2025.
Examination Report in CA 3203032 dated Oct. 8, 2024.
Examination Report in CA 3203032 dated Mar. 12, 2025.

* cited by examiner

LINEAR ARRAY OF PIEZOELECTRIC TRANSDUCERS FOR TOWED MARINE STREAMERS

CROSS-REFERENCE TO RELATED APPLICATIONS

The present application claims priority to International Patent Application No. PCT/EP2019/064947, filed Jun. 7, 2019, the entire disclosure of which is incorporated herein by reference. International Patent Application No. PCT/EP2019/064947 claims the benefit of U.S. Provisional Patent Application No. 62/682,319, filed Jun. 8, 2018, the entire disclosure of which is incorporated herein by reference.

BACKGROUND

The present disclosure is related generally to the field of marine surveying. Marine surveying can include, for example, seismic and/or electromagnetic (EM) surveying, among others. For example, this disclosure may have applications in marine surveying, in which one or more sources are used to generate wave-fields, and receivers—either towed or ocean bottom—receive energy generated by the sources and affected by the interaction with the subsurface formation.

Marine surveying systems are used to acquire seismic and other data from Earth formations below the bottom of a body of water, such as a lake or the ocean. Marine surveying systems typically include a survey vessel which may have onboard navigation, seismic energy source control, and data recording equipment. The survey vessel is typically configured to tow one or more streamers through the water. The one or more streamers are in the most general sense long cables that have geophysical sensors disposed at spaced apart positions along the length of the cables. A typical streamer may extend behind the seismic vessel for several kilometers.

To acquire seismic data, seismic energy source control equipment on the survey vessel typically causes one or more seismic energy sources (which may be towed in the water by the survey vessel or by another vessel) to actuate. Signals produced by various sensors on the one or more streamers are ultimately conducted to the recording equipment, where a record with respect to time is made of the signals produced by each sensor (or groups of such sensors). The recorded signals are later interpreted to infer the structure and composition of the Earth formations below the bottom of the body of water. Knowledge of the structure and composition of the Earth formations is highly valuable for the efficient exploration and recovery of offshore petroleum resources.

These drawings illustrate certain aspects of some of the embodiments of the present invention and should not be used to limit or define the invention.

DETAILED DESCRIPTION

The present disclosure is related, more specifically, to an array of piezoelectric transducers with cross-feed attenuation. The array is configured in a specific manner to give superior cross-feed performance in marine towed arrays. In the relevant art, cross-feed may also be referred to as cross-talk. The array may be a linear array.

Marine towed streamers often employ linear arrays of small piezoelectric sensors. Examples of such sensors include hydrophones and accelerometers. The arrays may be formed by connecting sensors in parallel, such as with unscreened twisted pairs of wires, although series or series/parallel wiring combinations are also possible. In some instances, the array may include between 4 and 20 sensors such that the array has a length between 3.125 meters and 12.5 meters. In at least one embodiment, the length of the array may be selected in respect of a wavelength of interest such that a directional array response is created. However, embodiments are not necessarily limited to any particular quantity of sensors or a particular length of array. Examples of spacing for the sensors within the array include uniform spacing, random spacing, and tapered spacing. The relative sensitivities and impedances of the sensors may be similar, random, or purposefully different to create a sensitivity taper for the purpose of modifying the array's spatial response. The formation of the array may facilitate spatial filtering of undesirable energy that propagates along the length of the streamer as it is towed through a turbulent body of water.

Piezoelectric sensors may be designed to be used at frequencies that are well below any electrical or mechanical self-resonant frequency that they may possess. The sensors can have comparatively high electrical impedance, which is predominately capacitive in nature, in the lower frequency region. Electrical connection can be made to the sensors via preamplifiers or coupling transformers, for example. Examples of preamplifiers that may be used include voltage mode and charge mode preamplifiers.

Because many of the streamer's other electrical conductors may run both directly adjacent to and in parallel with arrays of piezoelectric sensors, there is often significant opportunity for undesirable cross-feed of common mode signals, which may also be referred to in the art as common mode noise. In an attempt to combat this problem, preamplifiers are designed to be of a differential configuration. Preamplifiers are configured such that their output signal is proportional to the difference between the signals presented at their inputs. By connecting a sensor array directly across the two inputs of a differential preamplifier, the electrical signal from the sensor array can appear as a differential signal and as such, is amplified. Conversely, common mode signals that manifest at each of the differential preamplifier's inputs can cancel and therefore not be amplified (the difference between two things that are the same is zero).

For purposes of understanding the operation of the presently-disclosed solution, relevant equivalent circuits are discussed below in relation to FIG. 1A-1F.

Figure 1A:
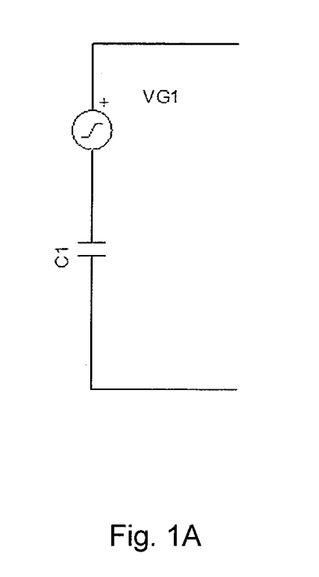
FIG. 1A depicts a circuit model of a piezoelectric sensor.

A circuit model of a piezoelectric sensor, such as a hydrophone or accelerometer, is shown in FIG. 1A. VG1 represents the open circuit voltage sensitivity of the sensor and C1 represents the low-frequency capacitance of the sensor.

Figure 1B:
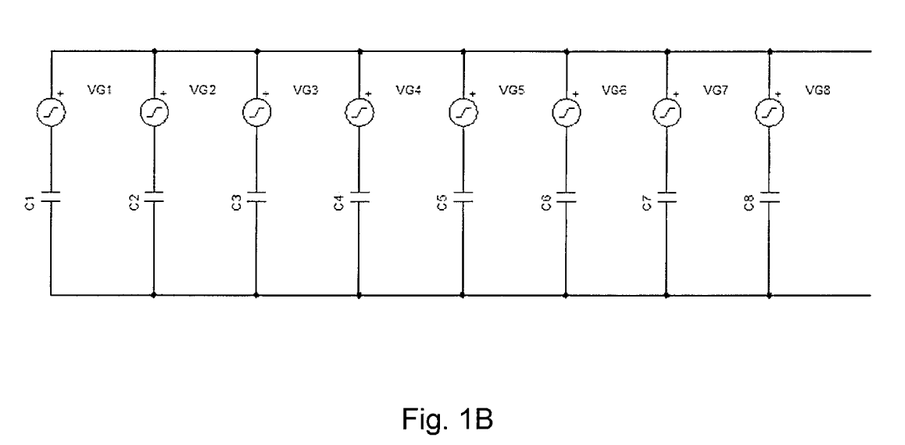
FIG. 1B depicts a circuit model of several identical piezoelectric sensors which are connected in an array.

A circuit model of a group of several piezoelectric sensors connected to form a spatial filter is depicted in FIG. 1B. In particular, a group or array of eight identical piezoelectric sensors is shown. The open circuit voltage sensitivities of the sensors are represented by VG1, VG2, VG3, VG4, VG5, VG6, VG7 and VG8, and the corresponding low-frequency capacitances of the sensors are represented by C1, C2, C3, C4, C5, C6, C7 and C8, respectively. Such a spatial filter has the capability to attenuate noise of mechanical origin that travels down a seismic streamer as it is towed through water.

Figure 1C:
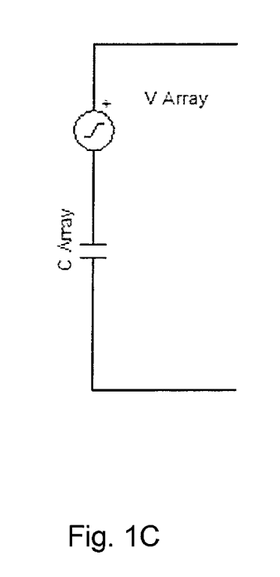
FIG. 1C shows an equivalent circuit for the array of identical piezoelectric sensors of FIG. 1B.

FIG. 1C shows an equivalent circuit for the array of eight identical piezoelectric sensors of FIG. 1B. $V_{Array}$ represents the open circuit voltage sensitivity of the array, where $V_{Array}$=VG1=VG2=VG3=VG4=VG5=VG6=VG7=VG8, and $C_{array}$ represents the low-frequency capacitance of the array, were $C_{Array}$=C1+C2+C3+C4+C5+C6+C7+C8.

The equivalent circuit of the array of sensors shown in FIG. 1C is a "single ended" model. In seismic streamers, differential amplifiers are used with the goal of eliminating undesirable "common mode" noise. As such, in analyzing such systems having a sensor array and a differential preamplifier, a "differential" model is better suited than a "single ended" model for the sensor array.

Figure 1D:
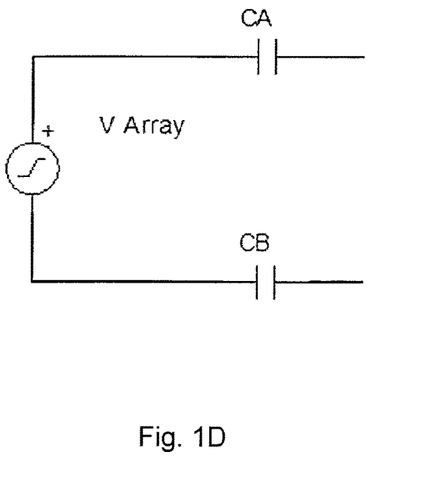
FIG. 1D depicts a differential circuit model for an array of piezoelectric sensors, which may be hydrophones or accelerometers, for example.

A differential circuit model of the array of piezoelectric sensors in FIG. 1C is depicted in FIG. 1D. As shown, instead of the array capacitance $C_{Array}$ in the single-ended model of FIG. 1C, the differential circuit model of FIG. 1D includes the low-frequency capacitances CA and CB, where the relationship between CA, CB and $C_{Array}$ is given below in Equation 1, below. Note also that CA=CB=2$C_{Array}$.

Figure 1E:
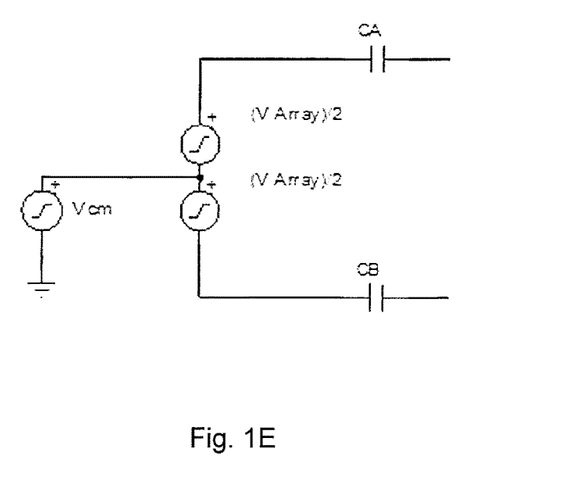
FIG. 1E depicts a differential circuit model for a sensor array where the voltage source is considered as a "common mode" voltage source and two "half" voltage sources.

To conduct analysis of the behavior of a differential preamplifier in response to a common mode signal while a sensor is connected to its input, it is necessary to have a sensor model that allows the injection of a common mode signal. As depicted in FIG. 1E, this is achieved by splitting the voltage source in the differential model into two, identical "half voltage sources", referred to as (VArray)/2, and connecting a common mode voltage source, referred to as Vcm, between the common node of the two "half voltage sources" and electrical ground to emulate the behavior of common mode signals that may couple through some means into the differential amplifier.

In the case where only "common mode" analysis is of interest, the differential "half voltage sources" may be removed from the equivalent circuit model and replaced by equivalent impedances. For an ideal voltage source with an impedance of 0 ohms, the "half voltage sources" may be replaced by electrical shorts to produce the differential common-mode sensor-array model depicted in FIG. 1F.

Figure 1F:
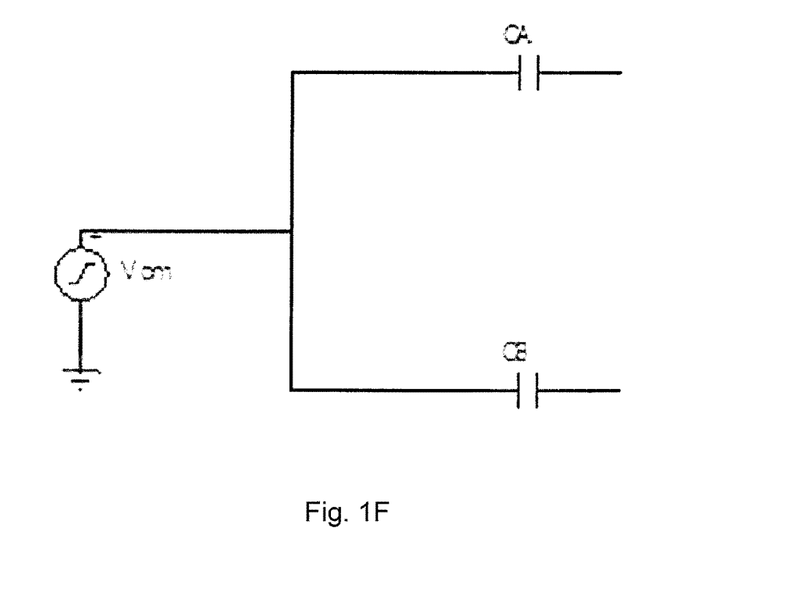
FIG. 1F depicts a differential circuit model for a sensor array for common mode analysis.
Figure 2A:
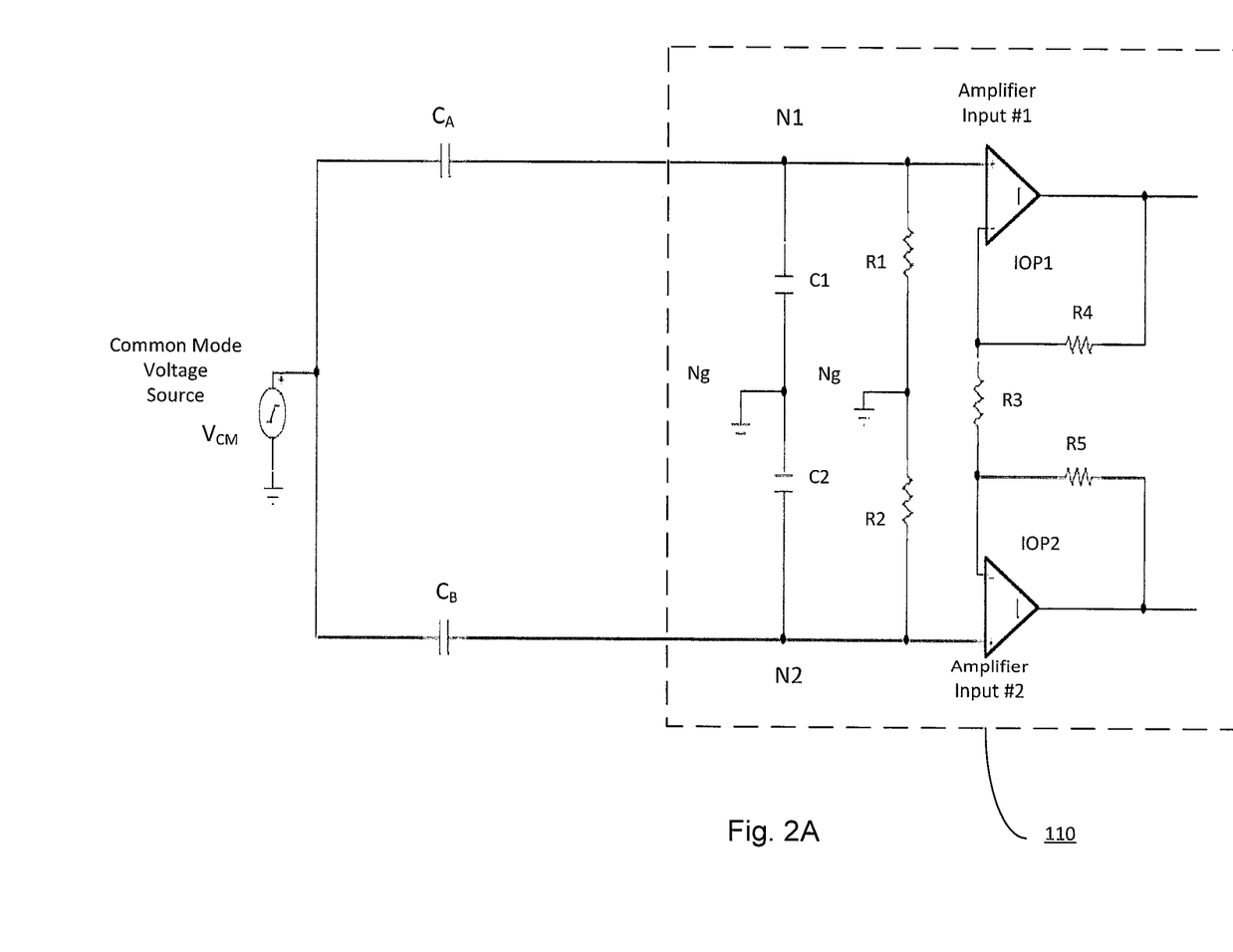
FIG. 2A shows an idealized circuit diagram of a differential circuit model for a sensor array for common mode analysis coupled to the inputs of a voltage mode differential preamplifier.

Now consider coupling the differential common-mode sensor-array model depicted in FIG. 1F to a voltage-mode differential preamplifier 110. The resultant circuit is shown in FIG. 2A. In other words, FIG. 2A may be considered as showing an idealized version of an array providing a sensor output to the input of a differential preamplifier 110. Note that the specific preamplifier circuit structure illustrated in FIG. 2A shows one example circuit structure for the preamplifier input; other circuit structures of similar functionality may be used in accordance with embodiments of the invention.

As discussed above in relation to FIG. 1A through 1F, the array of sensors is represented by two identical capacitors $C_A$ and $C_B$, each having an identical capacitance of $C_{array}$·2 ($C_{array}$ times 2, where $C_{array}$ is the equivalent capacitance of the array). The two capacitors are connected electrically in series. Thus, the equivalent capacitance of the two capacitors $C_A$ and $C_B$ connected in series is:

$$\frac{C_A \cdot C_B}{C_A + C_B} = \frac{(C_{array} \cdot 2) \cdot (C_{array} \cdot 2)}{(C_{array} \cdot 2) + (C_{array} \cdot 2)} = C_{array} \quad \text{(Equation 1)}$$

Using a series combination to represent the sensor array enables us to inject an ideal common mode signal, $V_{CM}$, to each of the series capacitors $C_A$ and $C_B$ using a single common-mode voltage source, as shown.

IOP1 and IOP2 are input operational amplifiers of the differential preamplifier in the circuit structure of FIG. 2A. A first preamplifier input (Amplifier Input #1) is received by the positive input terminal of IOP1 via node N1 from the capacitor $C_A$, and a second preamplifier input (Amplifier Input #2) is received by the positive input terminal of IOP2 via node N1 from the capacitor $C_B$.

C1 and C2 represent the common-mode input capacitances of the differential preamplifier and are conventionally assumed to be of identical capacitance. C1 connects node N1 to a mid ground node Ng, and C1 connects node N2 to Ng.

R1 and R2 are bias resistors that are conventionally assumed to be of identical resistance. R1 is configured in parallel to C1 and connects node N1 to the mid ground node Ng, and R2 is configured in parallel to C2 and connects node N2 to Ng.

The output terminal of IOP1 is connected via feedback resistor R4 to the negative input terminal of IOP1, and the output terminal of IOP2 is connected via feedback resistor R5 to the negative input terminal of IOP2. In addition, the resistor R3 (for example, R3=1 k ohms) connects the negative input terminals of IOP1 and IOP2. Resistors R4 and R5 are also assumed to be of identical resistance (for example, R4=R5=10 k ohms). As such, the differential gain of the preamplifier is equal to (1+2*R5/R3).

Given this idealistic circuit structure, the gain of the preamplifier to the common mode signal is unity. This is because the output of the preamplifier is proportional to the difference between the voltages at its two inputs, so no gain is applied to common mode signals as their difference is zero.

The above conclusion that no gain is applied to common mode signals (i.e. common mode noise) assumes that the common-mode voltage signal generates exactly equal voltages at each of the differential amplifier's inputs (i.e. at nodes N1 and N2). However, applicant has determined that this is not likely in practice for a typical array of piezoelectric transducers. This is because the voltages presented at nodes N1 and N2 are output voltages of two charge dividers formed between each half of the array capacitor model ($C_A$ and $C_B$, respectively) and the common-mode input capacitances (C1 and C2, respectively). When C1 and C2 are slightly different, the charge divisions become slightly different and therefore the voltages presented at each of the amplifier's inputs by the common mode signal are slightly different. In that case, the output of the differential preamplifier becomes equal to the slight difference between the input voltages multiplied by the preamplifier's differential gain (1+2*R5/R3). Note that the same issue exists in respect to the resistances R1 and R2 of the input circuit, but for simplicity, it can be assumed that they are equal.

Hence, when a differential voltage preamplifier is used with any array of piezoelectric sensors, the sensitivity of the resulting configuration to common mode noise signals picked up from other transmission lines (other conductors) is proportional to the difference between the common mode capacitances C1 and C2 of each of the preamplifier's differential inputs. As such, it is desirable to ensure that these capacitances are the same.

Applicant has determined, however, that, while the input circuit may be designed and configured with C1 and C2 having identical capacitances, the symmetry between the two differential amplifier inputs is generally disturbed by cross-coupling between transmission lines, producing asymmetry. The cause of this asymmetry is described below in relation to FIG. 2B.

Note that common mode signals may couple from one transmission line to another via capacitive coupling, resistive coupling, or electromagnetic coupling, for example. The coupling mechanism for each of these is the respective mutual impedance between each of the conductors in each of the transmission lines. For simplicity, the present disclosure focuses on capacitances. However, similar mechanisms exist for resistance and inductance.

Figure 2B:
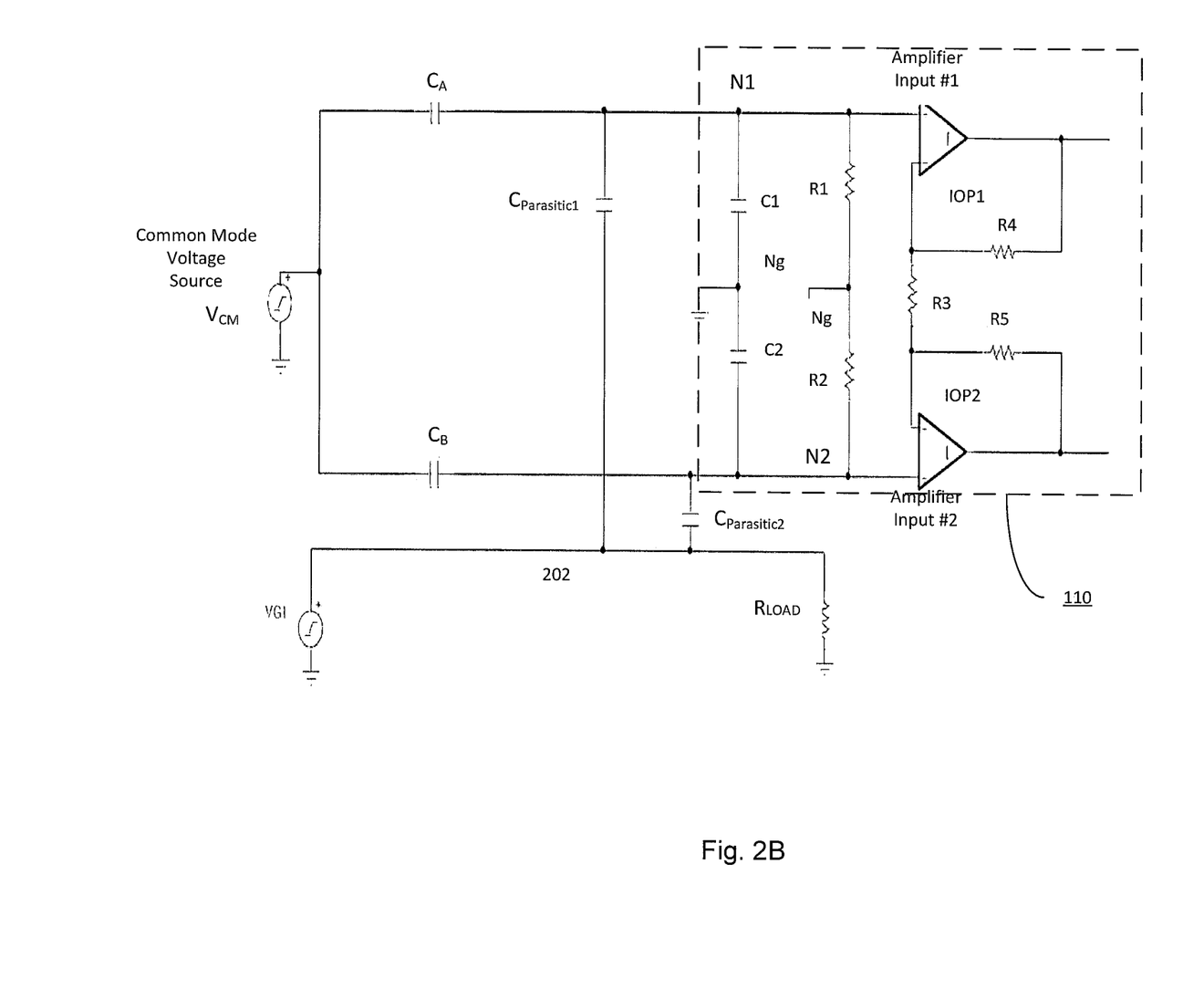
FIG. 2B is a more realistic circuit diagram which adds parasitic capacitances to the idealized circuit diagram in FIG. 1.

FIG. 2B is a more realistic circuit diagram which adds parasitic capacitances to the idealized circuit diagram in FIG. 2A. The circuit structure of FIG. 2B is similar to that illustrated in FIG. 2A with the addition of a single adjacent electrical conductor 202 which has mutual parasitic capacitances with the array of hydrophones. For example, the electrical conductor may be one conductor of an adjacent unscreened twisted pair of conductors that runs parallel to the array of hydrophones. As illustrated in FIG. 2, the electrical conductor may carry a voltage signal VG1 and be terminated with a resistive load $R_{Load}$ (which may be a typical value of 50 ohms, for example). The parasitic capacitances are represented by a first parasitic capacitance $C_{Parasitic1}$ which couples the electrical conductor to the first amplifier input at node N1 and a second parasitic capacitance $C_{Parasitic2}$ which couples the electrical conductor to the second amplifier input at node N2.

The parasitic capacitances are effectively connected in parallel with C1 and C2. As such, the effective capacitances between each of the differential amplifier's inputs and the mid ground point are ($C_{Parasitic1}$+C1) and ($C_{Parasitic1}$+C2), respectively. Therefore, any difference between the parasitic capacitances may have as significant an effect as the difference between C1 and C2 on the differential amplifier's ability to reject common mode signals.

To avoid cross-feed noise in towed streamers containing arrays of hydrophones, applicant has determined that the differential preamplifier for each array should include very well matched internal common mode impedances and also that the array of piezoelectric sensors itself should be constructed in such a way as to achieve very well matched, mutual parasitic common mode impedances with all other conductors present.

Applicant has further determined that, unfortunately, many of the hydrophones used in seismic streamers have some form of asymmetry in their structure that causes imbalance (differences) between the mutual parasitic capacitances that exist between each of the sensor's electrodes and nearby conductors. Such differences in common mode capacitance causes disruption of a differential preamplifier's ability to reject common mode signals, which results in cross-feed noise from nearby conductors.

An example of a hydrophone used in seismic streamers that has a structural asymmetry resulting in an imbalance of parasitic capacitances is the conventional hydrophone unit disclosed in U.S. Pat. No. 3,970,878 to Berglund and described below in relation to FIGS. 3 to 6.

Figure 3:
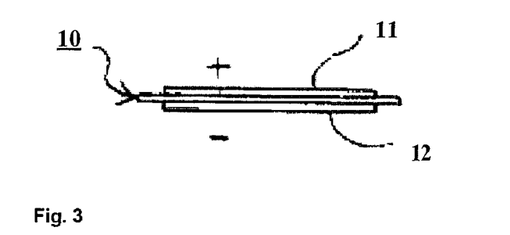
FIG. 3 is a perspective view of a piezoelectric wafer which may be used in a hydrophone half-element in accordance with an embodiment of the present invention.

FIG. 3 provides a side view of a piezoelectric wafer used in a hydrophone half-element of the conventional hydrophone unit of Berglund. The piezoelectric wafer has a portion 10, which may be made of a ceramic crystal, such as lead zirconate titanate, or a thermoplastic, such as polyvinylidene fluoride, for example, and may have metallized surfaces 11 and 12 on both sides. The metallized surfaces 11 and 12 may be deposits of silver and serve as poled electrodes. In particular, due to the orientation of the piezoelectric wafer 10, the top surface 11 is the positive electrode, and the bottom surface 12 is the negative electrode.

Figure 4:
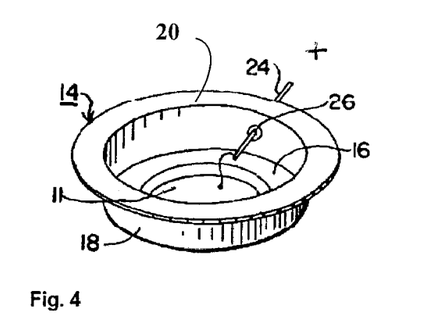
FIG. 4 is a perspective view of a shell member of the hydrophone half-element of a first form in accordance with an embodiment of the present invention.

FIG. 4 is a perspective view of a cup-shaped shell member 14 of the hydrophone half-element of the conventional hydrophone unit of Berglund. The conventional hydrophone sensor uses two such shell members 14, which may be beryllium copper (BeCu) shells, for example. Each shell member 14 has a planar end wall portion 16, a sidewall portion 18 and a flange 20. A wire terminal 24 passes through a glass bead 26 which is bonded in a hole which is provided through the sidewall 18 of the shell 14. The negative poled electrode 12 of the piezoelectric wafer is mounted to the inner surface of the end wall 16 such that the positive poled electrode 11 faces inwardly of the shell member 14. A wire connects the positive poled electrode 11 to the wire terminal 24.

Figure 5:
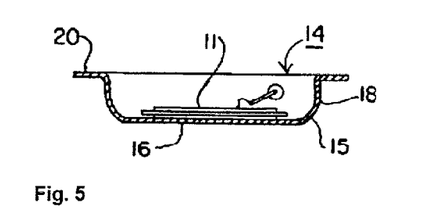
FIG. 5 is a sectional view of the shell member of the hydrophone half-element of the first form showing the piezoelectric wafer bonded in the end portion of the shell and connected to a feed through terminal in accordance with an embodiment of the present invention.

FIG. 5 is a sectional view of the shell member of the conventional hydrophone half-element showing the piezoelectric wafer bonded in the end portion 16 of the shell such that the positive poled electrode 11 faces inwardly of the shell member 14. As further shown, a curved filet portion 15 connects the end portion to the sidewall 18 of the shell member 14.

Figure 6:
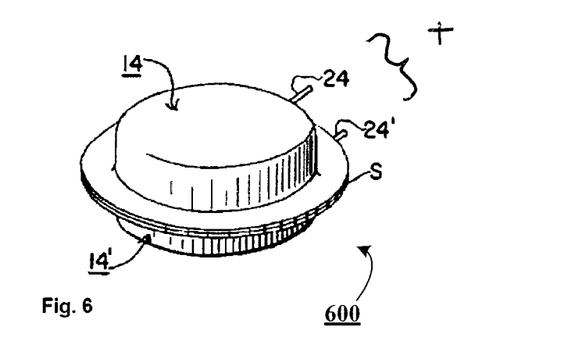
FIG. 6 depicts two hydrophone half-elements which are joined together to create a sealed hydrophone element of the first form which is suitable for use in a marine environment in accordance with an embodiment of the present invention.

FIG. 6 is a perspective view of the conventional hydrophone unit formed by two of the hydrophone half-elements joined together. As depicted, they may be joined, for example, by soldering the flanges together (S). The conductive body of the unit, farmed by the shell members (14 and 14'), provides a negative poled (−ve) electrode that connects to the negative polarity side 11 of the two piezoelectric wafers 10 inside the body. The wire terminals (24 and 24') are wired together to provide a positive poled (+ve) electrode that connects to the positive polarity side 12 of the two piezoelectric wafers 10 inside the body.

Applicant has observed that the surface area of the resulting hydrophone unit's positive poled electrode, which is formed by connecting the wire terminals (24 and 24') is significantly smaller than the surface area of the negative poled electrode, which is formed from the conductive body of the shell members (14 and 14'). This structural asymmetry causes an imbalance of parasitic capacitances that exist between each of the unit's electrodes and nearby conductors. As explained below, this imbalance disrupts the ability of the differential preamplifier to reject common mode noise signals from a linear array of such hydrophone units.

Figure 7:
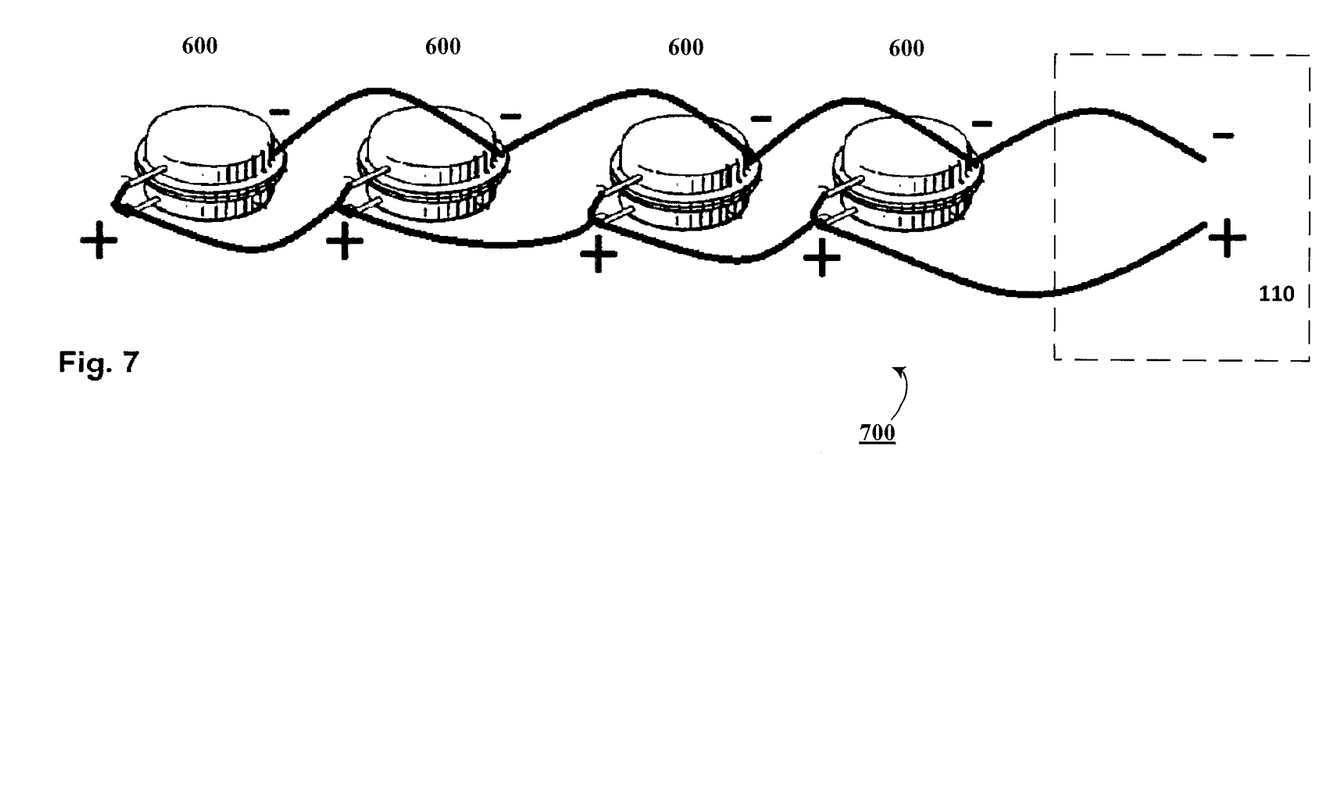
FIG. 7 is a diagram of an array of hydrophone elements of a same type.

FIG. 7 is a diagram of a linear array 700 of conventional hydrophone units 600 of the type described by Berglund. As shown, the linear array 700 is formed by connecting the +ve electrodes (i.e. the wire terminals 24 and 24') of the hydrophone elements 600 in series to a positive polarity (+) input of the differential preamplifier 110, and connecting the −ve electrodes (i.e. the conductive bodies 14 and 14') of the hydrophone elements 600 in series to a negative polarity (−) input of the differential preamplifier 110.

Disadvantageously, in the array 700 of FIG. 7, the surface area of the +ve electrodes is significantly smaller than the surface area of the −ve electrodes. As such, the mutual parasitic capacitance that exists between each of the electrodes of this arrangement and a nearby conductor is substantially different. Hence, the effective common mode capacitances asymmetrical so that there exists substantial cross-feed noise from nearby conductors in this arrangement.

According to an embodiment of the present invention, this problem of cross-feed noise may be overcome by introducing a form of electrode symmetry to the arrays of piezoelectric sensors. Using the array 700 illustrated in FIG. 7 as an example, improvements may be made to form a modified array 1100 illustrated in FIG. 11 (to be further described below). Advantageously, the modified array 1100 has substantially reduced susceptibility to cross-feed noise.

In accordance with an exemplary implementation, the modified array 1100 includes array elements of different forms. As shown by the exemplary implementation of the modified array 1100 depicted in FIG. 11, the modified array 1100 may be constructed from equal numbers of hydrophone units of a first form 600 and a second form 1000.

The first form 600 may be substantially similar or identical to the hydrophone unit described above in relation to FIGS. 3-6. On the other hand, the second form 1000 may be a modified hydrophone unit with piezoelectric discs 10 connected in a reversed polar orientation compared to that of the first form 600. In other words, the first form and second form may be identical except that their polarity to a change in acoustic pressure is opposite.

Figure 8:
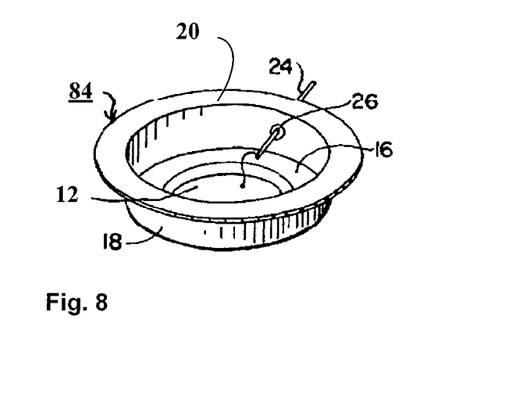
FIG. 8 is a perspective view of a shell member of a hydrophone half-element which has been modified to be of a second form in accordance with an embodiment of the present invention.
Figure 9:
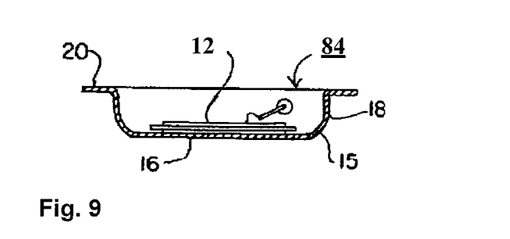
FIG. 9 is a sectional view of the shell member of the hydrophone half-element which has been modified to be of the second form in accordance with an embodiment of the present invention.
Figure 10:
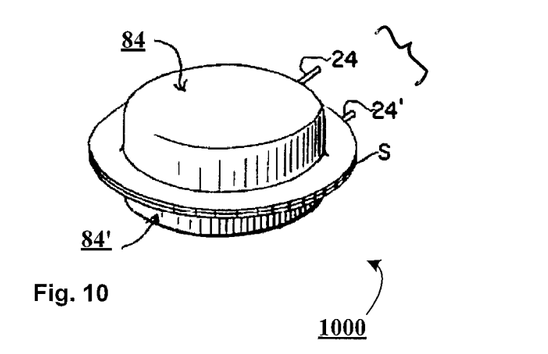
FIG. 10 depicts two hydrophone half-elements which are joined together to create a sealed hydrophone element of the second form which is suitable for use in a marine environment in accordance with an embodiment of the present invention.

The structure of the second form 1000 will now be described in relation to FIGS. 8-10. FIG. 8 is a perspective view of a cup-shaped shell member 84 (which may be beryllium copper shells, for example) of the modified hydrophone half-element of the second form 1000. The difference from the hydrophone half-element of the first form 600 is that the positive poled electrode 11 of the piezoelectric wafer is mounted to the inner surface of the end wall 16 such that the negative poled electrode 12 faces inwardly of the shell member 84. A wire connects this negative poled electrode 12 to the wire terminal 24. FIG. 9 is a sectional view of the shell member 84 of the second form 1000 showing the piezoelectric wafer bonded in the end portion 16 of the shell such that the negative poled electrode 12 faces inwardly of the shell member 14. Finally, FIG. 10 is a perspective view of the hydrophone unit of the second form 1000 which is formed by two of the hydrophone half-elements (84 and 84') joined together. The conductive body of the unit, formed by the shell members (84 and 84'), provides a positive poled (+ve) electrode that connects to the positive polarity side 12 of the two piezoelectric wafers 10 inside the body. The wire terminals (24 and 24') are wired together to provide a negative poled (−ve) electrode that connects to the negative polarity side 11 of the two piezoelectric wafers 10 inside the body.

Figure 11:
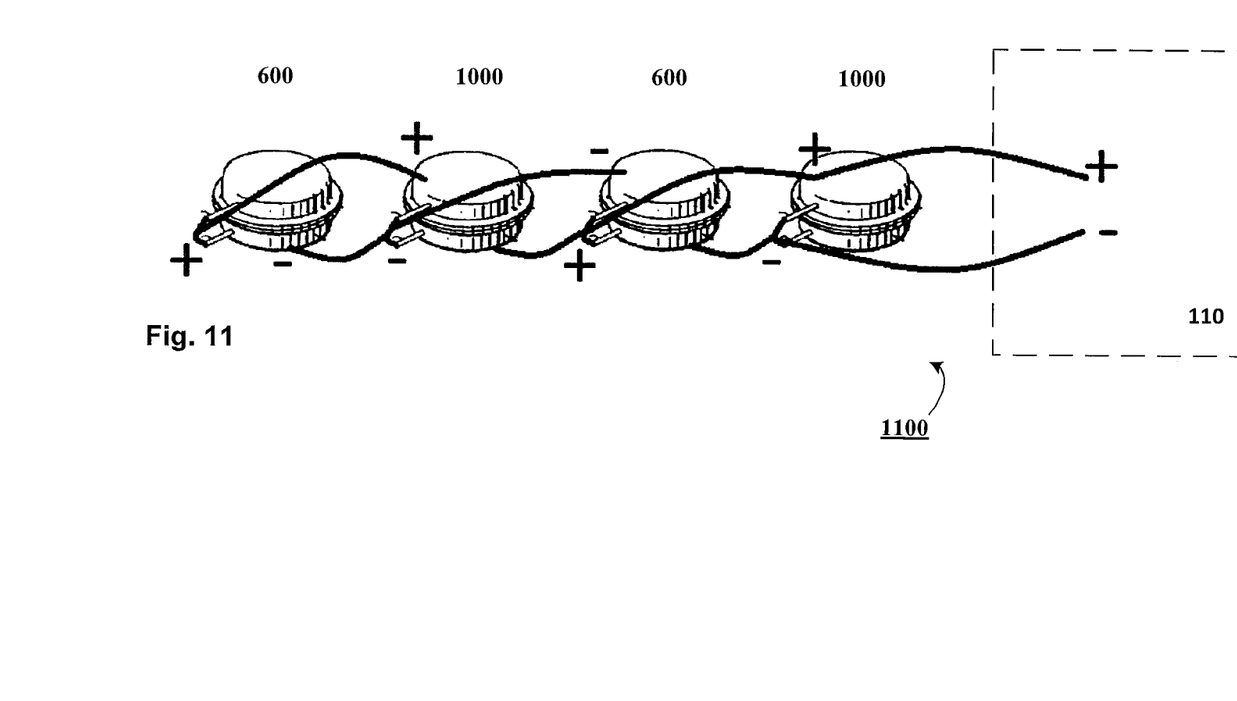
FIG. 11 is a diagram of an array of hydrophone elements of alternating type in accordance with an embodiment of the present invention.

FIG. 11 is a diagram of a linear array 1100 of hydrophone units of alternating first 600 and second 1000 forms in accordance with an embodiment of the invention. As shown, the linear array 1100 is formed by (1) connecting the +ve electrodes (i.e. the wire terminals) of the hydrophone elements of the first form 600 to the +ve electrodes (i.e. the shells) of the hydrophone elements of the second form 1000 in an alternating manner and (2) connecting the −ve electrodes (i.e. the shells) of the hydrophone elements of the first form 600 to the −ve electrodes (i.e the wire terminals) of the hydrophone elements of the second form 1000 in an alternating manner. The signal from the series of +ve electrodes is provided via a connection to a positive polarity (+) input of the differential preamplifier 110, and the signal from the series of −ve electrodes is provided via a connection to a negative polarity (−) input of the differential preamplifier 110. Note that, while FIG. 11 illustratively shows two hydrophone units of each form, the number of hydrophone (or other sensor types) of each form may be any number from one or more but is preferably an even number (2, 4, 6, etc.) in order to work well. Moreover, more than two forms may be employed in some embodiments, alternated in a similar manner to achieve the desired symmetry and cross-feed insensitivity.

Advantageously, in the array 1100 of FIG. 11, the surface area of the +ve electrodes is substantially the same as the surface area of the −ve electrodes. As such, the mutual parasitic capacitance that exists between the positive and negative electrodes of this arrangement and a nearby conductor is substantially the same. Hence, the effective common mode capacitances are symmetrical so that cross-feed noise from nearby conductors in this arrangement is reduced.

In other words, for the modified array 1100, the mutual parasitic capacitance of each of the effective electrodes to a nearby conductor is approximately equal. As such, connecting this arrangement to a differential voltage preamplifier 110 does not result in a loss of the preamplifier's ability to reject common mode signals. Such an arrangement therefore offers superior cross-feed performance compared to some previous approaches.

Figure 12:
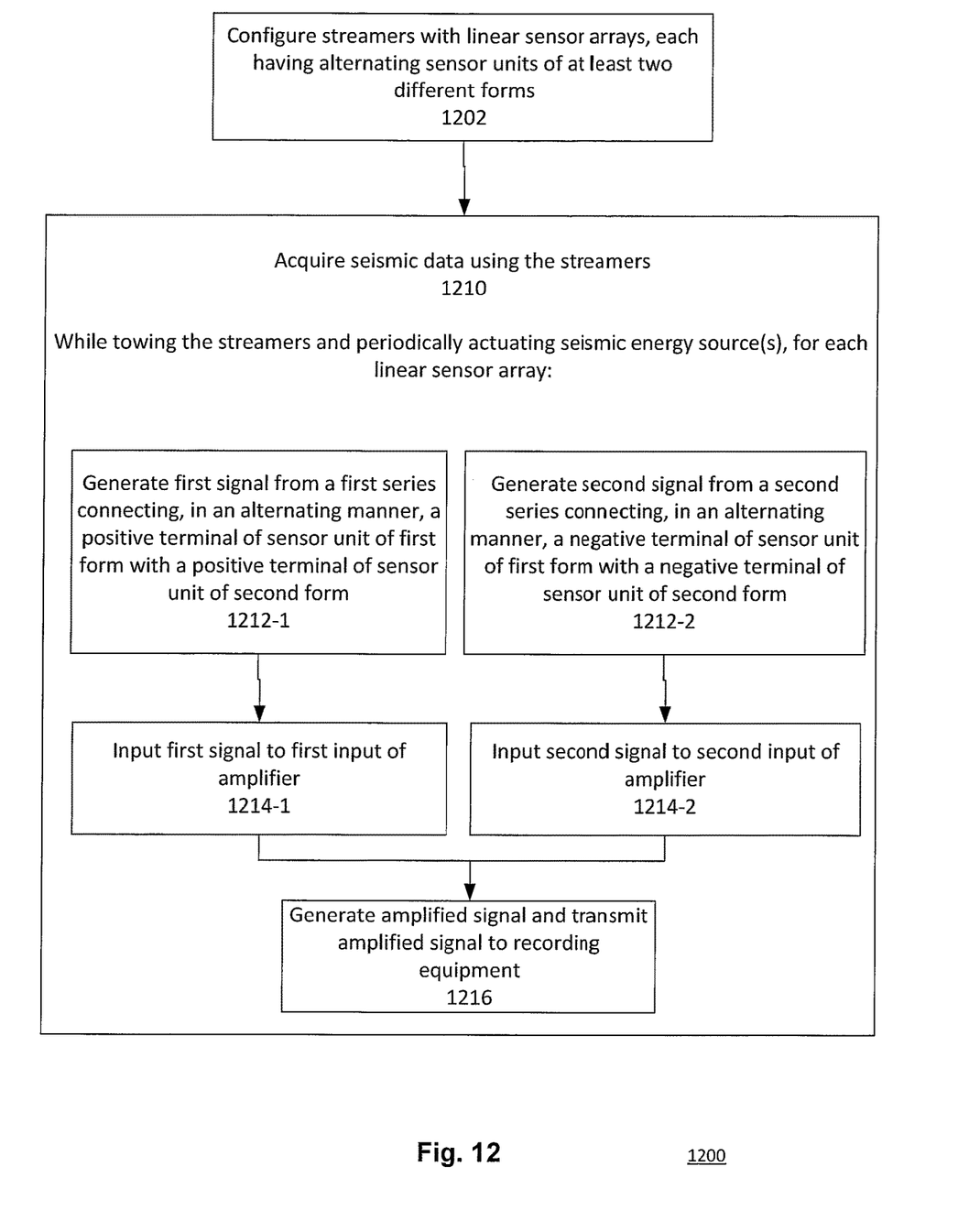
FIG. 12 is a flow chart of a method of acquiring seismic data in a marine survey in accordance with an embodiment of the present invention.

FIG. 12 is a flow chart of a method 1200 of acquiring seismic data in a marine survey in accordance with an embodiment of the present invention. The method obtains amplified sensor signals from marine streamers being towed by a vessel during the marine survey. As depicted in block 1202, the marine streamers are configured with linear sensor arrays, each having alternate sensor units of at least two different forms. Per block 1210, seismic data is acquired using the streamers. In an exemplary implementation, while towing the streamers and periodically actuating one or more seismic energy sources, the following steps may be performed for each linear sensor array. Per block 1212-1, a first signal is generated from a first series connecting, in an alternating manner, a positive terminal of a first form of a sensor unit with a positive terminal of a second form of the sensor unit. Meanwhile, per block 1212-2, a second signal is generated from a second series connecting, in an alternating manner, a negative terminal of the first form of the sensor unit with a negative terminal of the second form of the sensor unit. Per block 1214-1, the first signal is provided to a first input of an amplifier (which may be a differential amplifier or a charge amplifier, for example). Meanwhile, per block 1214-2, a second signal is provided to a second input of the amplifier. Per block 1216, the amplifier generates an amplified signal from the first and second signals by the amplifier, and the amplified signal is transmitted to recording equipment that may be part an onboard acquisition system.

Figure 13:
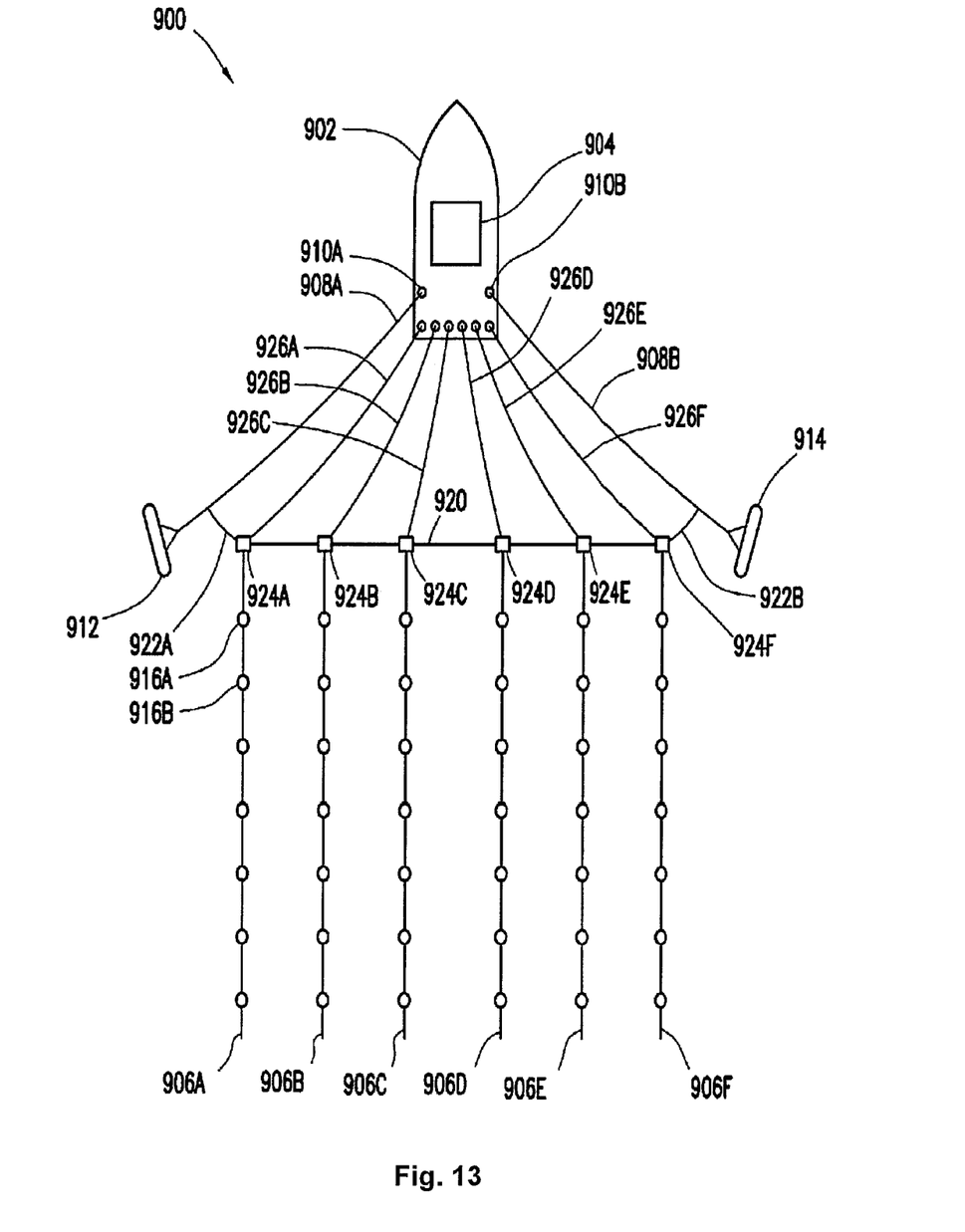
FIG. 13 is a top view of an exemplary implementation of a marine geophysical survey system with towed streamers in accordance with an embodiment of the invention.

FIG. 13 is an overhead view of an exemplary implementation of a marine geophysical survey system 900 with towed streamers in accordance with an embodiment of the invention. As shown, a survey vessel 902 is configured with onboard equipment 904, such as navigation, energy source control, and data recording equipment. The survey vessel 902 may be further configured to tow one or more streamers 906A-F through the water. While FIG. 13 illustratively shows six streamers 906, any number of streamers 906 may be used. The discussion continues with respect to streamers 906 being sensor streamers, but streamers 906 are illustrative of any towed geophysical survey cable, such as transmitter cables and source cables.

The sensor streamers 906 are coupled to towing equipment that maintains the streamers 906 at selected depth and lateral positions with respect to each other and with respect to the survey vessel 902. The towing equipment may comprise two paravane tow lines 908A and 908B each coupled to the vessel 902 by way of winches 910A and 910B, respectively. The winches enable changing the deployed length of each paravane tow line 908. The second end of paravane tow line 908A is coupled to a paravane 912, and the second end of paravane tow line 908B is coupled to paravane 914. In each case, the tow lines 908A and 908B couple to their respective paravanes through respective sets of lines called a "bridle". The paravanes 912 and 914 are each configured to provide a lateral force component to the various elements of the survey system when the paravanes are towed in the water. The combined lateral forces of the paravanes 912 and 914 separate the paravanes from each other until the paravanes put one or more spreader lines 920, coupled between the paravanes 912 and 914, into tension. The paravanes 912 and 914 either couple directly to the spreader line 920, or as illustrated couple to the spreader line by way of spur lines 922A and 922B.

The sensor streamers 906 are each coupled, at the ends nearest the vessel 902 (i.e., the proximal ends) to a respective lead-in cable termination 924A-F. The lead-in cable terminations 924 are coupled to or are associated with the spreader lines 920 so as to control the lateral positions of the streamers 906 with respect to each other and with respect to the vessel 902. Electrical and/or optical connections between the appropriate components in the recording system 904 and the sensors (for example, 916A, 916B, . . . ) in the streamers 906 may be made using inner lead-in cables 926A-F. Much like the tow lines 908 associated with respective winches 910, each of the lead-in cables 926 may be deployed by a respective winch or similar spooling device such that the deployed length of each lead-in cable 926 can be changed. Sensors 916A, 916B may each include a linear sensor array and preamplifier circuit, such as disclosed herein, to detect seismic signals which may be generated by a source, such as an air gun or marine vibrator and reflected by the sea floor and the geologic formations lying beneath.

At least one embodiment of the present disclosure may include an array of transducers. For example, the transducers may be piezoelectric sensors. The array may include a first plurality of transducers of a first form configured to have a first polarity in response to a change in an environmental condition and a second plurality of transducers of a second form coupled to the first plurality of transducers and configured to have a second polarity, opposite of the first polarity, in response to the change in the environmental condition. The first plurality may be equal to the second plurality. However, the solution should still provide improvement if the first plurality is different from the second plurality, especially when a large number of sensors are being used. The first plurality of transducers may be coupled to the second plurality of transducers in a linearly alternating fashion such that a first transducer of the first form is connected to a first transducer of the second form, the first transducer of the second form is connected to a second transducer of the first form, and the second transducer of the first form is connected to a second transducer of the second form. The array may be coupled to a differential preamplifier. The array may be included along a length of at least a portion of a marine streamer and an electrical conductor can be included along the length adjacent to and in parallel with the array. In at least one embodiment, there is no or substantially reduced cross-feed between the array and the electrical conductor.

The first plurality of transducers and the second plurality of transducers may each comprise hydrophone half elements including a shell into which is adhered a polarized disc comprising a piezoelectric wafer. In this embodiment, the first plurality of transducers may each include the respective polarized disc connected in position with a first polar orientation, and the second plurality of transducers may each include the respective polarized disc connected in position with a second polar orientation opposite the first polar orientation. In at least one embodiment, the respective polarized discs can be formed of lead zirconate titanate (PZT).

Note that flexural disc transducers of this type are just one example transducer that would benefit from this method; there are other types of transducers, such as polarized capacitive diaphragms and rigidly end-capped cylinders, which would also benefit. Hence, the present solution may be used with various types of transducers, including piezoelectric sensors, polarized capacitive diaphragms, rigidly end-capped cylinders, and other transducers.

Another embodiment relates to a method of acquiring sensor signals in a marine streamer being towed by a vessel during a seismic marine survey. A first signal is generated by a first form of a sensor unit within a sensor array of the marine streamer, and a second signal is generated by a second form of the sensor unit within the sensor array. The first signal is provided to a first input of a differential preamplifier, and the second signal is provided to a second input of the differential preamplifier. The differential preamplifier generates an amplified signal from the first and second signals by the differential preamplifier, and the amplified signal is transmitted to recording equipment.

The marine streamer may include a plurality of sensor arrays that are spaced apart from each other along the streamer. Each one of the plurality of sensor arrays may include said first and second forms of sensor units so as to generate amplified signals with minimal cross-feed noise. The sensor array may be a linear array, and the sensor units of the first form may be coupled to the sensor units of the second form in a linearly alternating fashion. The sensor array may include an equal number of sensor units of the first and second forms, and the first and second forms of the sensor unit may utilize polarized discs with opposite polarities. A first signal may be obtained from a first set of electrodes in the sensor array, and a second signal may be obtained by a second set of electrodes in the sensor array. The first set of electrodes and the second set of electrodes preferably have substantially equal areas. The sensor units may be hydrophone units which generate electrical signals in response to pressure changes.

Another embodiment relates to an apparatus for marine seismic data acquisition. The apparatus may include: an onboard acquisition system; a plurality of towed streamers that are communicatively connected to the onboard acquisition system; and a plurality of linear arrays of sensors spaced apart on each of the plurality of towed streamers. Each said linear array of sensors may include a first plurality of hydrophones of a first form configured to have a first polarity in response to a change in an environmental condition, and a second plurality of hydrophones of a second form coupled to the first plurality of hydrophones and configured to have a second polarity, opposite of the first polarity, in response to the change in the environmental condition. The first plurality is preferably equal to the second plurality.

Within each said linear array, the hydrophones of the first form may be coupled to the hydrophones of the second form in a linearly alternating fashion such that: a first hydrophone of the first form is connected to a first hydrophone of the second form; the first hydrophone of the second form is connected to a second hydrophone of the first form; and the second hydrophone of the first form is connected to a second hydrophone of the second form. Each of the plurality of linear arrays may be coupled to a corresponding differential preamplifier of a plurality of differential preamplifiers. For each said linear array, a first signal may be provided from a first set of electrodes to a first input of the corresponding differential preamplifier, a second signal may be provided from a second set of electrodes to a second input of the corresponding differential preamplifier, and the first set of electrodes and the second set of electrodes may have equal areas. The plurality of differential preamplifiers may transmit amplified sensor signals to the onboard acquisition system.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A marine seismic sensor array, comprising:
   at least a first hydrophone and a second hydrophone, each comprising:
      exactly one positive terminal electrode that has a positive terminal electrode surface area and corresponds to a single first electrical node, and exactly one negative terminal electrode that has a negative terminal electrode surface area and corresponds to a single second electrical node distinct from the first electrical node, wherein:
   the first and second hydrophones are oppositely configured in that the positive terminal electrode surface area of the first hydrophone is smaller than the negative terminal electrode surface area of the first hydrophone, and the negative terminal electrode surface area of the second hydrophone is smaller than the positive terminal electrode surface area of the second hydrophone;
   the positive terminal electrodes of the first and second hydrophones are electrically connected to form one signal from the positive terminal electrodes;
   the negative terminal electrodes of the first and second hydrophones are electrically connected to form one signal from the negative terminal electrodes; and
   the positive terminal electrode surface area of the first and second hydrophones combined is the same as the negative terminal electrode surface area of the first and second hydrophones combined.

2. The sensor array of claim 1, wherein the first hydrophone and the second hydrophone each comprise:
   a body formed by a pair of opposing electrically conductive shell members arranged such that each shell member in the pair is electrically connected to the other shell member in the pair; and
   a pair of piezoelectric elements, each attached to a respective one of the shell members on an inner surface thereof and oriented such that an inwardly facing side of each piezoelectric element in the pair has the same polarity as the inwardly facing side of the other piezoelectric element in the pair, and such that an outwardly facing side of each piezoelectric element in the pair is electrically connected to the shell member to which it is attached.

3. The sensor array of claim 2:
   wherein the inner surfaces to which the piezoelectric elements are attached are flat and the piezoelectric elements are planar.

4. The sensor array of claim 1, wherein the hydrophones comprise piezoelectric sensors.

5. The sensor array of claim 1, wherein the hydrophones comprise polarized capacitive diaphragms.

6. The sensor array of claim 1, wherein the hydrophones comprise rigidly end-capped cylinders.

7. The sensor array of claim 1, wherein:
- the sensor array is linear and comprises a plurality of the first hydrophones and a plurality of the second hydrophones arranged in alternating fashion such that each of the first hydrophones is adjacent to at least one of the second transducers hydrophones;
- the positive terminal electrodes of all of the hydrophones are electrically connected to form the one signal from the positive terminal electrodes; and
- the negative terminal electrodes of all of the hydrophones are electrically connected to form the one signal from the negative terminal electrodes.

8. The sensor array of claim 7, wherein the a total number of the first hydrophones in the sensor array is the same as a total number of the second hydrophones in the sensor array.

9. The sensor array of claim 1, wherein:
- the one signal from the positive terminal electrodes and the one signal from the negative terminal electrodes are coupled to opposite inputs of a differential amplifier.

10. The sensor array of claim 9, wherein the sensor array and the differential amplifier are included along a length of at least a portion of a marine streamer.

\* \* \* \* \*